(12) United States Patent
Savir et al.

(10) Patent No.: US 11,615,366 B2
(45) Date of Patent: Mar. 28, 2023

(54) EVALUATION OF PRODUCT-RELATED DATA STRUCTURES USING MACHINE-LEARNING TECHNIQUES

(71) Applicant: EMC IP Holding Company LLC, Hopkinton, MA (US)

(72) Inventors: Amihai Savir, Sansana (IL); Arthur Wensing, Nieuw-Vennep (NL); Noga Gershon, Dimona (IL); Marcel Bernard Körner, Chorvatsky Grob (SK); Ivan Mlynek, D. Jurkovica (SK); Jorge Luis Perez, Coral Gables, FL (US); Michael Rupert James Thatcher, Streatley (GB); Dhev George Kollannur, Austin, TX (US); Omer Sagi, Mazkaret Batya (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 28 days.

(21) Appl. No.: 16/849,199

(22) Filed: Apr. 15, 2020

(65) Prior Publication Data

US 2021/0326795 A1    Oct. 21, 2021

(51) Int. Cl.
*G06Q 10/06*  (2012.01)
*G06N 5/04*  (2006.01)
(Continued)

(52) U.S. Cl.
CPC ......... *G06Q 10/06395* (2013.01); *G06N 5/04* (2013.01); *G06N 20/00* (2019.01);
(Continued)

(58) Field of Classification Search
None
See application file for complete search history.

(56) References Cited

U.S. PATENT DOCUMENTS 7,499,871 B1 * 3/2009 McBrayer ............ G06Q 50/188
705/7.42
9,679,305 B1 * 6/2017 Bhat ...................... G06Q 30/06
(Continued)

OTHER PUBLICATIONS

Natter, Martin, et al. "Practice prize report—An assortmentwide decision-support system for dynamic pricing and promotion planning in DIY retailing." Marketing Science 26.4 (2007): 576-583 (Year: 2007).*

(Continued)

*Primary Examiner* — Darlene Garcia-Guerra
(74) *Attorney, Agent, or Firm* — Ryan, Mason & Lewis, LLP

(57) ABSTRACT

Artificial intelligence (AI)-based techniques are provided that predict a quality score for a product-related data structure associated with one or more products. One method comprises obtaining data for a given product-related data structure; evaluating a plurality of first features related to a customer account associated with the given product-related data structure using the obtained data; evaluating a plurality of second features related to the given product-related data structure using the obtained data; processing at least some of the first features and the second features using at least one model that provides a predicted quality score for the given product-related data structure; and applying one or more thresholds to the predicted quality score to determine an acceptance status related to the given product-related data structure. A weighting of the first features and the second features can be learned during a training phase.

20 Claims, 12 Drawing Sheets

(51) Int. Cl.
  *G06Q 30/00* (2012.01)
  *G06Q 10/10* (2012.01)
  *G06Q 10/08* (2012.01)
  *G06N 20/00* (2019.01)
  *G06Q 10/0639* (2023.01)
  *G06Q 30/018* (2023.01)
  *G06Q 10/087* (2023.01)

(52) U.S. Cl.
  CPC .......... *G06Q 10/087* (2013.01); *G06Q 10/10* (2013.01); *G06Q 30/0185* (2013.01)

(56) References Cited

U.S. PATENT DOCUMENTS

| | | | | |
|---|---|---|---|---|
| 10,346,885 | B1* | 7/2019 | Shariff | G06Q 30/0244 |
| 10,438,229 | B1* | 10/2019 | Viswanath | G06Q 30/0249 |
| 10,861,069 | B2* | 12/2020 | Hutchinson | G06Q 30/06 |
| 11,151,532 | B2* | 10/2021 | Saini | G06F 16/2379 |
| 2007/0050289 | A1* | 3/2007 | Zeller | G06Q 40/025 |
| | | | | 705/38 |
| 2008/0126264 | A1* | 5/2008 | Tellefsen | G06Q 30/0283 |
| | | | | 705/400 |
| 2012/0054642 | A1* | 3/2012 | Balsiger | G06Q 10/107 |
| | | | | 715/752 |
| 2012/0303408 | A1* | 11/2012 | Eder | G06Q 10/06375 |
| | | | | 705/7.28 |
| 2014/0006109 | A1* | 1/2014 | Callioni | G06Q 30/02 |
| | | | | 705/7.35 |
| 2014/0207544 | A1* | 7/2014 | Mavinkurve | G06Q 30/0207 |
| | | | | 705/14.13 |
| 2014/0310065 | A1* | 10/2014 | Chowdhary | G06Q 30/0283 |
| | | | | 705/7.35 |
| 2015/0142545 | A1* | 5/2015 | Ceribelli | G06Q 30/0222 |
| | | | | 705/14.23 |
| 2015/0379429 | A1* | 12/2015 | Lee | G09B 5/00 |
| | | | | 706/11 |
| 2016/0189188 | A1* | 6/2016 | White | G06Q 30/0206 |
| | | | | 705/7.35 |
| 2019/0147532 | A1* | 5/2019 | Singh | G06Q 40/04 |
| | | | | 705/35 |
| 2019/0347688 | A1* | 11/2019 | Shariff | G06Q 30/0244 |
| 2020/0065736 | A1* | 2/2020 | Relangi | G06Q 10/0639 |
| 2020/0134683 | A1* | 4/2020 | Boren | G06F 16/904 |
| 2021/0049648 | A1* | 2/2021 | Thoman | G06Q 30/0275 |

OTHER PUBLICATIONS

Rajan Gupta, Chaitanya Pathak, A Machine Learning Framework for Predicting Purchase by Online Customers based on Dynamic Pricing, Procedia Computer Science, vol. 36, 2014, pp. 599-605 (Year: 2014).*

Gauri, Dinesh K., et al. "An empirical analysis of the impact of promotional discounts on store performance." Journal of Retailing 93.3 (2017): 283-303. (Year: 2017).*

Deutsch, Alin, et al. "Automatic verification of data-centric business processes." Proceedings of the 12th international Conference on Database Theory. 2009 (Year: 2009).* https://www.reviewshake.com/enterprise, downloaded on Apr. 13, 2020.

https://www.perfectprice.com/, downloaded on Apr. 13, 2020.

http://www.oracle.com/us/mittr-machine-learning-5097368.pdf, downloaded on Apr. 13, 2020.

* cited by examiner

ORDER FEATURES 300

| FEATURE 310 | DESCRIPTION 320 |
|---|---|
| ORDER_ID | ORDER IDENTIFIER |
| ORDER_ID_SRC | ORDER CATEGORY |
| ORDER_SIZE | SUM OF REVENUE |
| ORDER_MGN_PERC | ORDER MARGIN PERCENTAGE |
| ORDER_STATUS | ORDER LABEL (APPROVED/DENIED) |

FIG. 3

ITEM FEATURES 400

| FEATURE 410 | DESCRIPTION 420 |
|---|---|
| BRAND_CATG_DESC | LEVELS OF PRODUCT DATA (LOWEST LEVEL, SECOND LEVEL ....) |
| LOB_DESC | LINE OF BUSINESS |
| BELOW_FLOOR | PRICE BELOW FLOOR FLAG |
| PU_REVN_AS_SLD_DISC_USD | PER UNIT REVENUE AFTER DISCOUNT |
| PU_DISC_PERC | DISCOUNT % |
| PU_MGN_PERC | MARGIN % |
| PU_F/C/R_REVN | PER UNIT FLOOR/COMPENSATION/RECOMMENDED REVENUE |
| SYS_QTY | NUMBER OF UNITS |
| REVN_AS_SLD_DISC_USD | REVENUE FROM ITEM (REVENUE X # ITEMS) |
| REVN_AS_SLD_RL_USD | REVENUE IF LIST PRICE IS CHARGED |
| MGN_AS_SLD_USD | ACTUAL MARGIN |
| F/C/R_REVN | FLOOR/COMPENSATION/RECOMMENDED REVENUE |

FIG. 4

ACCOUNT FEATURES 500

| FEATURE 510 | DESCRIPTION 520 |
|---|---|
| SUB_ACCT_SLS_BU_LEVEL1_DESC | CLIENT PRODUCTS/ENTERPRISE PRODUCTS |
| SUB_ACCT_SLS_BU_LEVEL2_DESC | COUNTRY + CLIENT PRODUCTS/ENTERPRISE PRODUCTS |
| SUB_ACCT_SLS_BU_LEVEL3_DESC | OTHER SUB-CATEGORIES |
| ORDER_ACCT_ID | IDENTIFIER OF SUBACCOUNT. INFORMATION OF PARENT ACCOUNT (SUCH AS COMPANY ABC ITALY CAN BE A SUB-ACCOUNT OF COMPANY ABC EUROPE |
| YOY_GROWTH | YEAR OVER YEAR GROWTH (E.G., REVENUE AND MARGIN) |

FIG. 5

DASHBOARD 1000

| OVERALL SCORE 1010 | 64 |
|---|---|

ACCOUNT SCORE 1020  75

| | REVENUE GROWTH | MARGIN GROWTH | GOAL ATTAIN. |
|---|---|---|---|
| RELATIVE | 95 | 98 | 25 |
| ACTUAL | $5150K | $1320K | 15% |

ORDER SCORE 1030  77

| | MARGIN % | LIST PRICE MARGIN | NEW LINE OF BUSINESS |
|---|---|---|---|
| RELATIVE | 65 | 78 | 84 |
| ACTUAL | 40% | 75% | 1 |

PRODUCT (PR) SCORE 1040  47

| | | MARGIN % | FLOOR | REV./UNIT |
|---|---|---|---|---|
| ALL | RELATIVE | 56 | 44 | 46 |
| | ACTUAL | 40% | 4% | $2300 |
| PR 1 | RELATIVE | 90 | 33 | 96 |
| | ACTUAL | 41% | -5% | $4575 |
| PR n | RELATIVE | 50 | 84 | 4 |
| | ACTUAL | 28% | 12% | $204 |

FIG. 10

EVALUATION OF PRODUCT-RELATED DATA STRUCTURES USING MACHINE-LEARNING TECHNIQUES

FIELD

The field relates generally to the information processing techniques, and more particularly, to the processing of one or more data structures related to products.

BACKGROUND

Many large entities employ a special pricing unit to review discounts or other specialized pricing on one or more products in an order that a salesperson would like to offer to a customer. The special pricing unit may consider a number of characteristics of the order, such as the revenue and margins associated with the order and various characteristics associated with the customer, such as a prior purchase history. The pricing review, however, is often a difficult process that may consume a significant amount of time and resources of the special pricing unit. Thus, the pricing review may cause a significant delay before a given order is approved.

A need exists for improved techniques for reviewing discounts or other specialized pricing of an order for one or more products.

SUMMARY

In one embodiment, a method comprises obtaining data for a given product-related data structure; evaluating a plurality of first features related to a customer account associated with the given product-related data structure using the obtained data; evaluating a plurality of second features related to the given product-related data structure using the obtained data; processing one or more of the first features and one or more of the second features using at least one model that provides a predicted quality score for the given product-related data structure; and applying one or more thresholds to the predicted quality score to determine an acceptance status related to the given product-related data structure.

In at least some embodiments, the acceptance status of the given product-related data structure comprises one or more of an automatically accepted status in response to the predicted quality score exceeding a corresponding acceptance threshold, an automatically denied status in response to the predicted quality score being below a corresponding denial threshold, and an additional review required status in response to the predicted quality score being between the corresponding acceptance threshold and the corresponding denial threshold.

In one or more embodiments, the predicted quality score comprises an aggregation of at least two of an account score, a product-related data structure score and a product score for at least one product associated with the given product-related data structure. A weighting of each of the one or more first features and the one or more second features can be learned during a training phase.

Other illustrative embodiments include, without limitation, apparatus, systems, methods and computer program products comprising processor-readable storage media.

BRIEF DESCRIPTION OF THE DRAWINGS

FIGS. 3 through 5 are sample tables illustrating a number of exemplary order features, item features, and account features, respectively, according to some embodiments;

FIG. 10 illustrates an exemplary dashboard for presenting one or more aspects of the generated weighted order quality score of FIG. 9, according to one or more embodiments;

DETAILED DESCRIPTION

Figure 1:
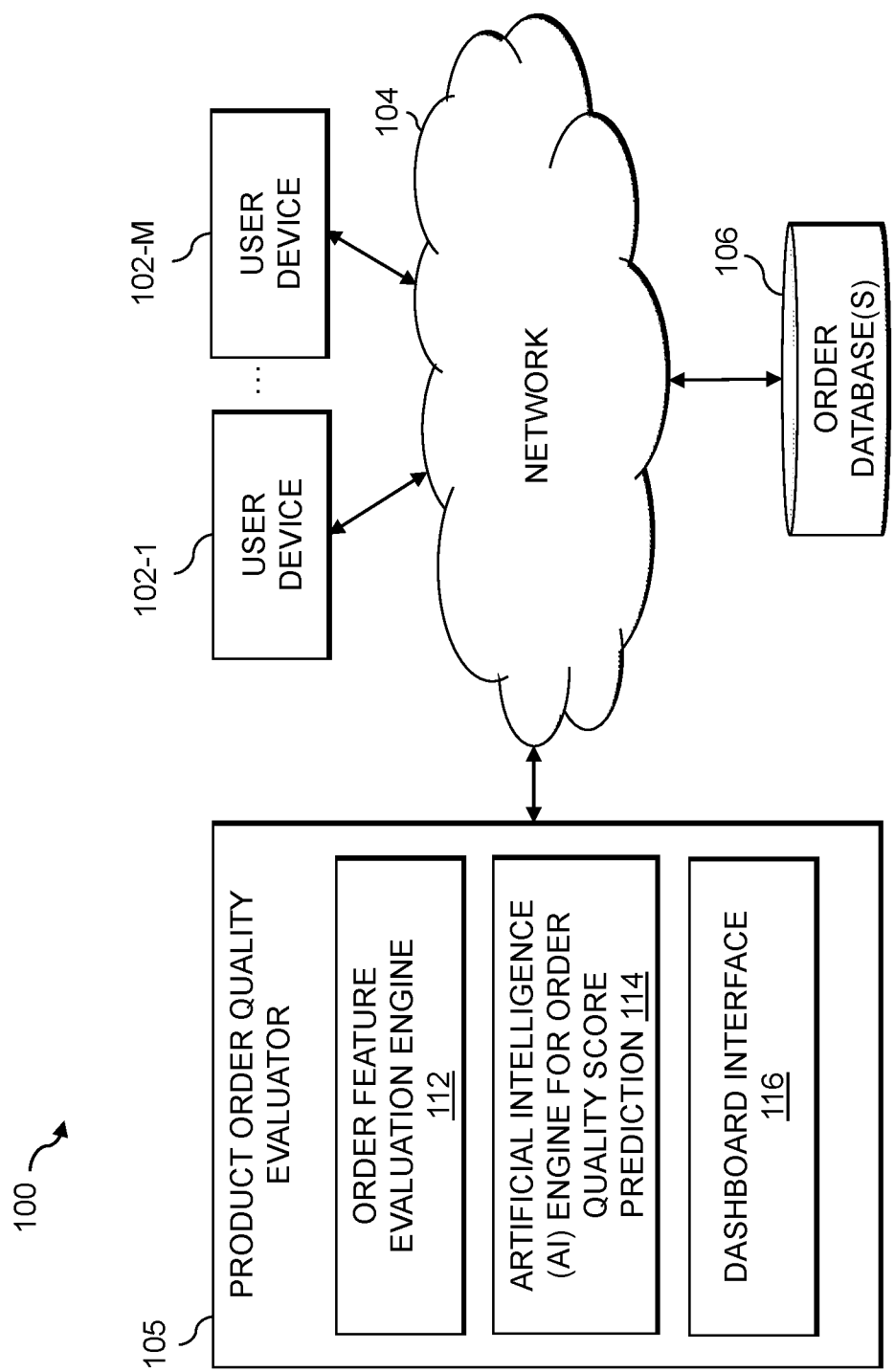
FIG. 1 shows a computer network configured in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products that employ AI techniques for predicting a quality score for a given product-related data structure associated with one or more products.

In one or more embodiments, order quality score prediction techniques are provided that can expedite the process of reviewing discounts or other specialized pricing of a given order. In some embodiments, a pricing review in accordance with the disclosed order quality score prediction techniques are more efficient and accurate by leveraging AI techniques, such as machine learning and/or statistical methods. As discussed further below, a number of features and/or key performance indicators (KPIs) associated with a given order and/or customer are applied to an AI engine, at least in some embodiments, to determine a quality score for the given order. The quality score can be applied to one or more thresholds to automatically approve or deny the order, and/or to prioritize the order for a manual pricing review.

While one or more embodiments are described herein in the context of a product order, the disclosed AI-based techniques may be applied to predict a quality score for any product-related data structure associated with one or more products. Thus, a product order is one example of what is more generally referred to herein as a "product-related data structure." Accordingly, the term "product-related data structure," as used herein, is intended to be broadly construed, so as to encompass, for example, any of a wide variety of tables or other arrangements of informational elements, illustratively relating to a product order, as would be apparent to a person of ordinary skill in the art.

A special pricing team may review order quotes, for example, that have at least one item that is priced below a specified floor price. Thus, if a sales representative wants to provide a price quote to the customer having one or more line items with a high discount (e.g., priced below a specified floor price or another violation of a specified pricing threshold), the price quote prepared by the sales representative typically must undergo an audit by the special pricing team. The special pricing team reviews the price quote, and often the business case, and the special pricing team will either approve, deny or modify the price quote for release to the customer.

The review by the special pricing team, however, can waste time and/or money, as there may be numerous quotes in a large enterprise requiring such a review. Thus, the handling time for the quote is increased and the response time may decrease, which may result in losing a given order.

In some embodiments, the order features and/or key performance indicators associated with an order may comprise one or more features related to characteristics of the account, as well as one or more features related to characteristics of a specific order. These features (and/or KPIs) are processed in accordance with the disclosed order quality score prediction techniques to determine whether a given order should be approved or denied (or undergo further review or modification). For example, orders that scored above or below a specified threshold can be automatically approved or automatically denied, respectively, and orders that received inconclusive results will be examined more thoroughly in some embodiments, for example, by the special pricing team.

In one or more embodiments, the disclosed order quality score prediction techniques evaluate a number of features related to characteristics of the account, as well as one or more features related to characteristics of a specific order and product to compare the individual features related to a given order to similar individual features of prior orders.

As noted above, the special pricing process can be a manual and labor-intensive process that may cause significant delays in order approvals. The disclosed artificial intelligence techniques for predicting a quality score for a given order for one or more products provide a data-driven solution that provides a data-driven method to score an order based on key categories, such as account, product and order characteristics using machine learning and/or statistical approaches; and an explanatory mechanism that enables the special pricing team experts to explore the impact of characteristics of an order on the generated score.

FIG. 1 shows a computer network (also referred to herein as a computer network and/or an information processing system) 100 configured in accordance with an illustrative embodiment. The computer network 100 comprises a plurality of user devices 102-1 . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is a product order quality evaluator 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective processing devices associated with a particular company, organization or other enterprise or group of users. The user devices 102 may be connected, at least in some embodiments, by an enterprise network. The enterprise network may comprise at least a portion of the computer network 100 of FIG. 1. Numerous other operating scenarios involving a wide variety of different types and arrangements of processing devices and networks are possible, as will be appreciated by those skilled in the art. The user devices 102 may further comprise a network client (not shown in FIG. 1) that can include networking capabilities such as ethernet and/or Wi-Fi.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the exemplary product order quality evaluator 105 can have one or more associated order databases 106 configured to store data pertaining to one or more product orders and related account and product information, etc.

The database(s) 106 in the present embodiment is implemented using one or more storage systems associated with (or a part of and/or local to) the product order quality evaluator 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the product order quality evaluator 105 can be one or more input-output devices, which illustratively comprise keyboards, displays or other types of input-output devices in any combination. Such input-output devices can be used, for example, to support one or more user interfaces to the product order quality evaluator 105, as well as to support communication between the product order quality evaluator 105 and other related systems and devices not explicitly shown.

The user devices 102 and the product order quality evaluator 105 in the FIG. 1 embodiment are assumed to be implemented using at least one processing device. Each such processing device generally comprises at least one processor and an associated memory, and implements one or more functional modules for controlling certain features of the product order quality evaluator 105.

More particularly, user devices 102 and the product order quality evaluator 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the user devices 102 and product order quality evaluator 105 to communicate over the network 104 with each other (as well as one or more other networked devices), and illustratively comprises one or more conventional transceivers.

As also depicted in FIG. 1, the product order quality evaluator 105 further comprises an order feature evaluation engine 112, an order quality score prediction artificial intelligence (AI) engine 114, and a dashboard interface 116. The exemplary order feature evaluation engine 112 evaluates a plurality of features, such as the exemplary order features, item features and account features discussed further below in conjunction with FIGS. 3 through 5. The exemplary order quality score prediction artificial intelligence (AI) engine 114 implements the disclosed techniques for determining a quality score for a given product order, as discussed further below, for example, in conjunction with FIGS. 2 and 6-9. In at least some embodiments, the exemplary dashboard interface 116 presents a dashboard, such as the dashboard discussed further below in conjunction with FIG. 10, and enables a user to interact with the presented dashboard. It is to be appreciated that this particular arrangement of modules 112, 14 and 116 illustrated in the product order quality evaluator 105 of the FIG. 1 embodiment is presented by way of example only, and alternative arrangements can be used in other embodiments. For example, the functionality associated with modules 112, 14 and 116 in other embodiments can be combined into a single module, or separated across a larger number of modules. As another example, multiple distinct processors can be used to implement different ones of modules 112, 14 and 116 or portions thereof.

At least portions of modules 112, 14 and 116 may be implemented at least in part in the form of software that is stored in memory and executed by a processor.

It is to be understood that the particular set of elements shown in FIG. 1 for approval and execution of restricted operations involving user devices 102 of computer network 100 is presented by way of illustrative example only, and in other embodiments additional or alternative elements may be used. Thus, another embodiment includes additional or alternative systems, devices and other network entities, as well as different arrangements of modules and other components.

Exemplary processes utilizing modules 112, 14 and 116 of exemplary product order quality evaluator 105 in computer network 100 will be described in more detail with reference to the flow diagram of FIGS. 2 and 6-9.

Figure 2:
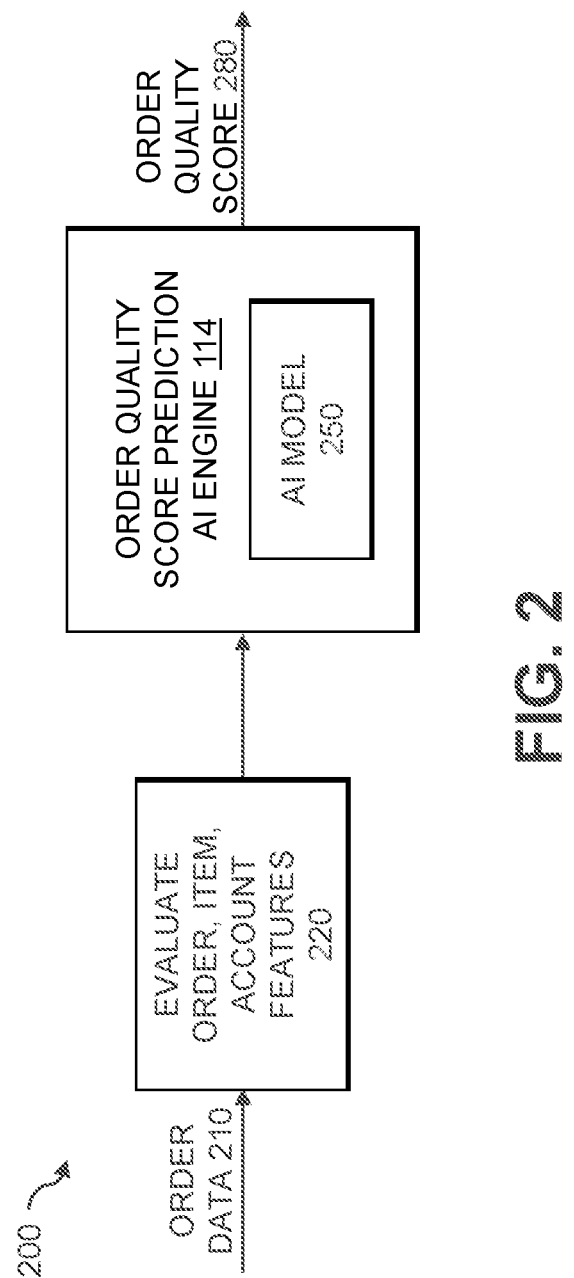
FIG. 2 is a flow chart illustrating an exemplary implementation of a quality score prediction process for an order pricing review, according to one embodiment of the disclosure.

FIG. 2 is a flow chart illustrating an exemplary implementation of an order quality score prediction process 200 for an order pricing review, according to one embodiment of the disclosure. As shown in FIG. 2, data 210 associated with an order is applied to a module 220 (e.g., the order feature evaluation engine 112) that evaluates one or more orders, items and/or account features, as discussed further below in conjunction with FIGS. 3 through 5. The evaluated features are then applied to the order quality score prediction AI engine 114 that includes an AI model 250, such as one or more machine learning and/or statistical models, discussed further below.

As shown in FIG. 2, the exemplary order quality score prediction AI engine 114 generates an order quality score 280. As noted above, the order quality score 280 can be applied to one or more thresholds to automatically approve or deny the order, and/or to prioritize the order for a manual pricing review.

FIG. 3 is a sample table illustrating a number of exemplary order features 300, according to some embodiments. Generally, as noted above, the exemplary order features 300 (features 310 with descriptions 320) are used to assess characteristics of a specific order.

In the example of FIG. 3, the exemplary order features 300 comprise an order identifier, an order category, a sum of revenue associated with the order, an order margin percentage, and an order label (e.g., approved/denied/further review).

FIG. 4 is a sample table illustrating a number of exemplary item features 400, according to some embodiments. Generally, the exemplary item features 400 are used to assess characteristics of the items (e.g., specific products) in a specific order. In the example of FIG. 4, the exemplary item features 400 comprise features 410 (with descriptions 420) directed to levels of product data, a line of business, a price below floor flag, a per unit revenue, a discount percentage, a margin percentage, a per unit floor/compensation/recommended revenue, a number of units, a revenue from item, a revenue if list price is charged, an actual margin, and a floor/compensation/recommended revenue feature.

For example, the margin percentage can be used to provide a score of per unit margin percentage based on other items in the neighborhood of the current item (which can be limited in some embodiments to specific brands), referred to as neighborhood based quality scores (also referred as statistical or bucket based). The price below floor may indicate the difference in some embodiments between an actual discount percent and a floor discount percent.

FIG. 5 is a sample table illustrating a number of exemplary account features 500, according to some embodiments. Generally, the exemplary account features 500 are used to assess characteristics of the particular customer account associated with a specific order. In the example of FIG. 5, the exemplary account features 500 comprise features 510 (with descriptions 520) directed to a client products/enterprise products flag, a country code with the client products/enterprise products flag, other sub-categories, a subaccount identifier and a year-over-year growth.

Figure 6:
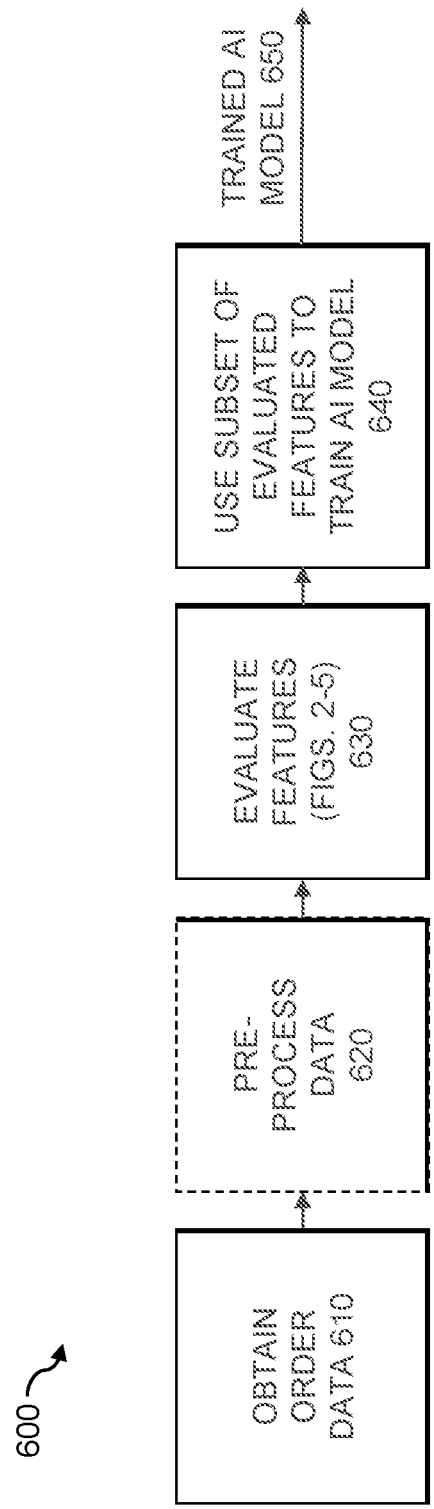
FIG. 6 is a flow chart illustrating an exemplary implementation of a model training process for order quality score prediction, according to some embodiments of the disclosure.

FIG. 6 is a flow chart illustrating an exemplary implementation of a model training process 600 for order quality score prediction, according to some embodiments of the disclosure. As shown in FIG. 6, the exemplary model training process 600 obtains order data during step 610 (e.g., typically historical order data) and may pre-process the data during step 620 (e.g., to ensure valid values and/or remove outliers). In addition, during step 620 the obtained order data 610 may be processed to split the obtained order data 610 into training, scoring and test datasets. Any references herein to optional steps or elements should not be construed to suggest that other steps or elements are required in other embodiments.

The pre-processed data is further processed during step 630 to evaluate a number of features related to each order, such as those features discussed above in conjunction with FIGS. 3 through 5. A subset of the features evaluated during step 630 are used during step 640 to generate a trained AI model 650, such as a trained machine learning model and/or a statistical model.

In some embodiments, the trained AI model 650, given characteristics of a new order, generates an order quality score that approximates a quality of the order in comparison to similar historical orders.

As indicated above, the calculation of an order quality score can be performed using machine learning techniques and/or neighborhood-based quality score techniques (also referred as statistical or bucket-based techniques). For example, a machine learning-based quality score is obtained by training a machine learning model that processes a set of features applied as inputs and predicts the metric (e.g., distance from floor, margin percentage, and/or list price). Thereafter, using the scoring data, the metric can be predicted for future previously unseen instances. The predicted metrics can then be normalized using, for example, an empirical cumulative distribution function (ECDF), and then conducting a known t-test on the residuals of the approved group versus the denied group to determine if there is a significant difference between the means of the two groups. The machine learning model with the best T-statistic score is selected to be the machine learning model for the metric at issue.

Likewise, a neighborhood-based quality score is obtained by splitting the data into a neighborhood (e.g., with combinations of features with an ECDF for each metric). For example, a neighborhood can be all the orders generated in Germany, having a particular product group and approximate order size. During an inference phase, all of the orders that fall into this neighborhood bucket will be scored in comparison to the orders from the training items that belong to this neighborhood.

Figure 7:
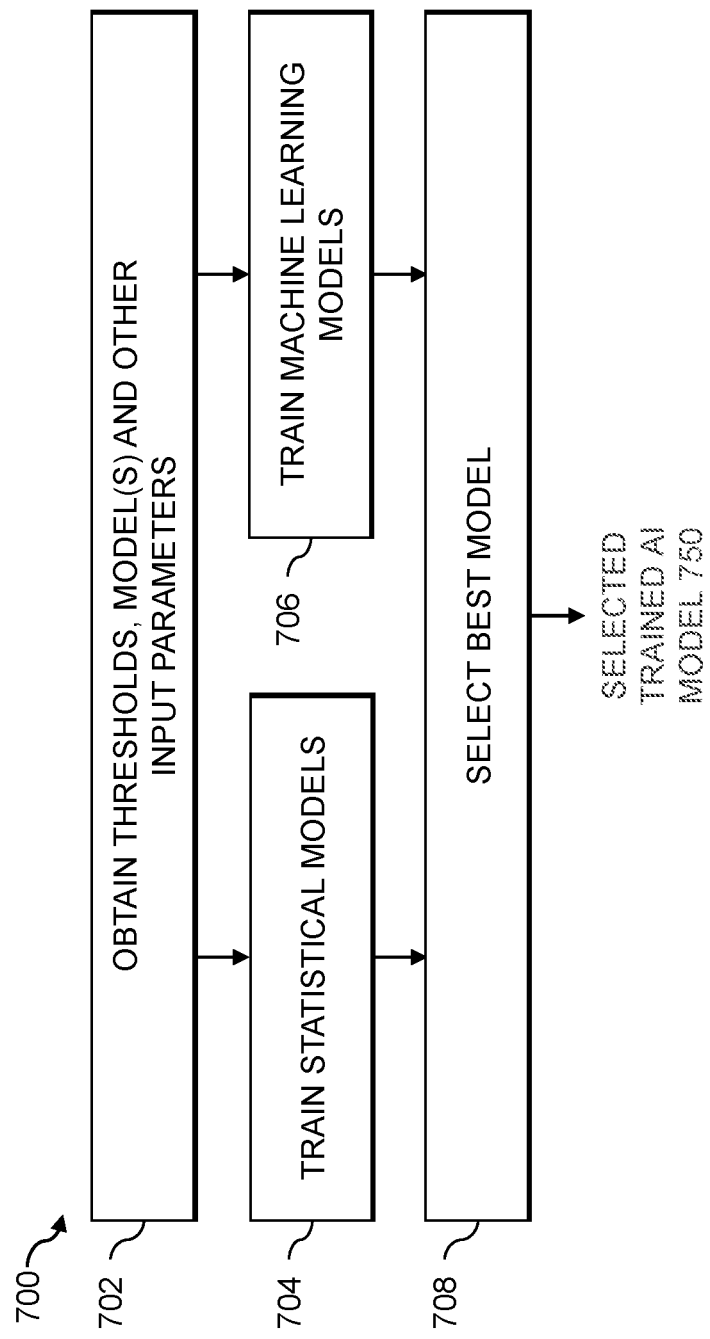
FIG. 7 is a flow chart illustrating an exemplary implementation of a model training and selection process for order quality score prediction, according to an embodiment of the disclosure.

FIG. 7 is a flow chart illustrating an exemplary implementation of a model training and selection process 700 for order quality score prediction, according to an embodiment of the disclosure. As shown in FIG. 7, the exemplary model training and selection process 700 initially obtains thresholds, statistical and/or machine learning models and other input parameters during step 702, such as a minimum number of neighbors, attributes and an evaluation metric.

The statistical models are trained during step 704 and the machine learning models are trained during step 706, using the training data. The best model is selected during step 708 as the selected trained AI model 750, in the manner described above.

Figure 8:
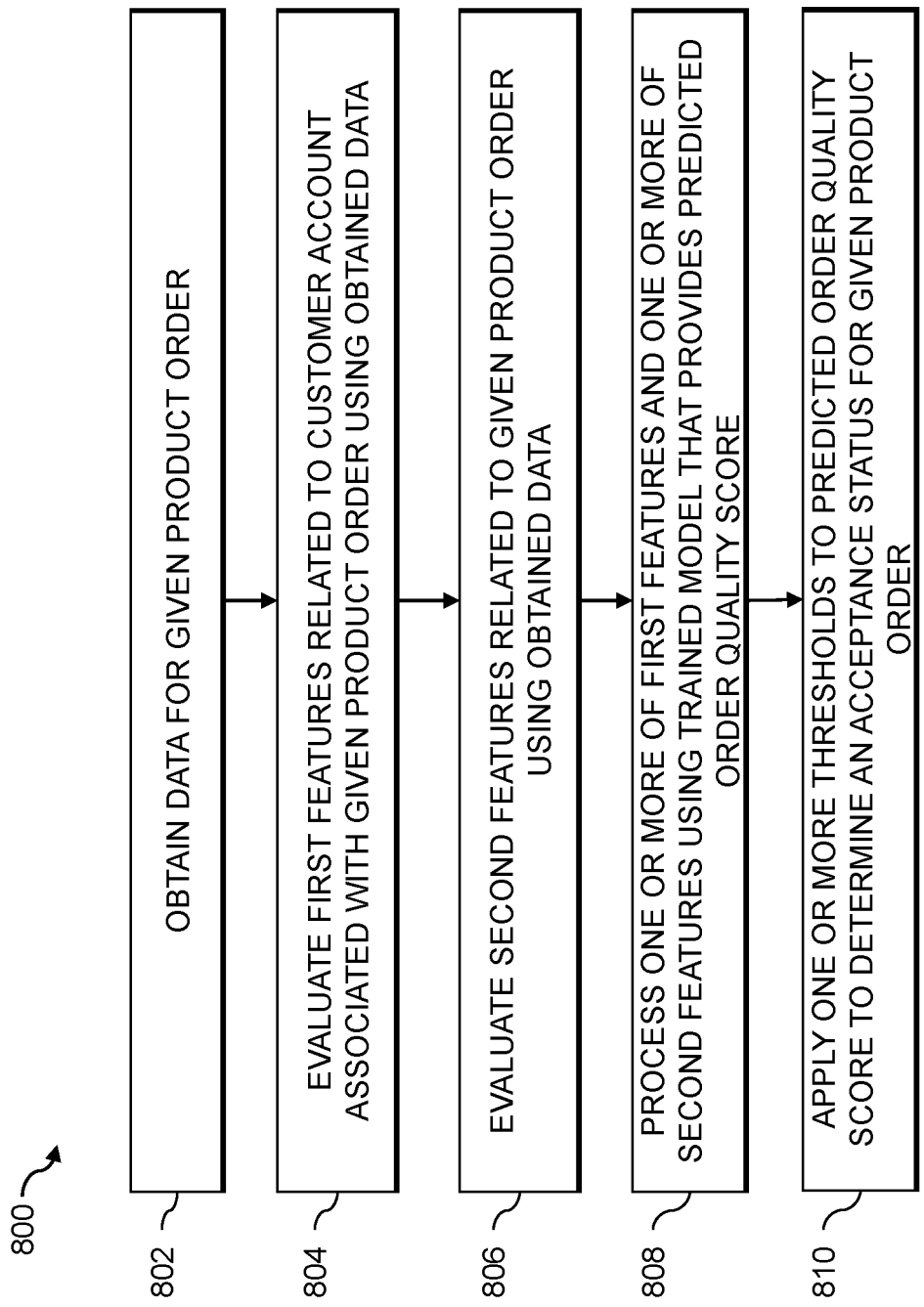
FIG. 8 is a flow chart illustrating an exemplary implementation of a quality score prediction process, according to one or more embodiments.

FIG. 8 is a flow chart illustrating an exemplary implementation of a quality score prediction process 800, according to one or more embodiments. As shown in FIG. 8, the exemplary quality score prediction process 800 initially obtains data for a given product-related data structure during step 802. The product-related data structure may be associated with, for example, a product order comprising an order for one or more products. The exemplary quality score prediction process 800 then evaluates a plurality of first features related to a customer account associated with the given product-related data structure using the obtained data during step 804 and evaluates a plurality of second features related to the given product-related data structure using the obtained data during step 806.

One or more of the first features and one or more of the second features are processed during step 808 using at least one model that provides a predicted quality score. Finally, one or more thresholds are applied to the predicted quality score during step 810 to determine an acceptance status related to the given product-related data structure.

Figure 9:
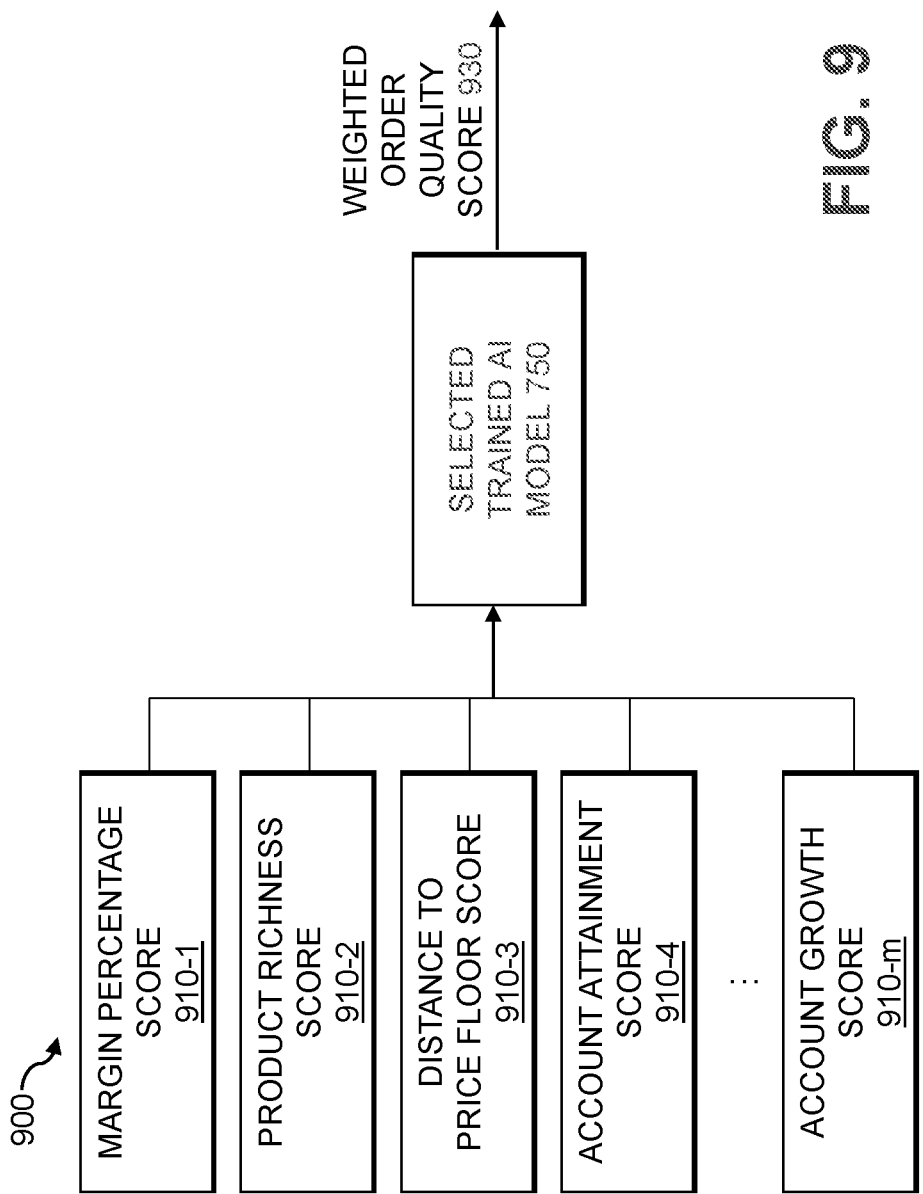
FIG. 9 illustrates a processing of multiple features by a selected artificial intelligence (AI) model to generate a weighted order quality score, according to some embodiments of the disclosure.

FIG. 9 illustrates a processing 900 of multiple features 910-1 through 910-$m$ by the selected trained AI model 750 to generate a weighted order quality score 930, according to some embodiments of the disclosure. Generally, the generated weighted order quality score 930 is used to determine whether a given order will be approved or denied (or require further review) based on the previously calculated metrics. Feature importance of the selected trained AI model 750 is used to assign the weighted order quality score 930 that encapsulates the quality of the order. As noted above, multiple models are trained using different machine learning and/or statistical algorithms with different parameters. Different features are evaluated towards selecting the model that best separates between approving and denying particular orders.

In the example of FIG. 9, the evaluated features (or metrics) comprise a margin percentage score 910-1, a product richness score 910-2, a distance to price floor score 910-3, an account attainment score 910-4, and an account growth score 910-$m$. The margin percentage score 910-1 scores the per unit margin percentage based on other items in the neighborhood of the current item (which can be limited in some embodiments to specific brands), referred to as neighborhood-based quality scores (also referred as statistical or bucket based). The product richness score 910-2 indicates the number of different products that are being sold (e.g., having one type of product in the order can be treated differently than having several different products). The distance to floor score 910-3 indicates the difference in some embodiments between an actual discount percent and a floor discount percent.

In addition, the account attainment score 910-4 indicates a ratio between ordered revenue and committed revenue, for each customer. Finally, the exemplary account growth score 910-$m$ indicates the growth in terms of revenue/margin in comparison to the previous year (e.g., whether the account is buying more or less each year).

In addition, in other embodiments, the selected trained AI model 750 may also evaluate a list price quality score, a margin in when the list price is charged, a revenue increase between each quarter, for example, for two consecutive years, and a margin increase between each quarter, for example, for two consecutive years.

The particular processing operations and other network functionality described in conjunction with the flow diagrams of FIGS. 2 and 6 through 9 are presented by way of illustrative example only, and should not be construed as limiting the scope of the disclosure in any way. Alternative embodiments can use other types of processing operations to predict an order quality score. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

FIG. 10 illustrates an exemplary dashboard 1000 for presenting one or more aspects of the generated weighted order quality score 930 of FIG. 9, according to one or more embodiments. As shown in FIG. 10, the exemplary dashboard 1000 presents an overall score 1010, an account score 1020, an order score 1030 and a product score 1040. In at least some embodiments, the overall score 1010 indicates how good a particular order is, considering all aspects of the order.

In one or more embodiments, the overall score 1010 comprises an aggregation of the account score 1020, the order score 1030 and the product score 1040. Generally, each of the account score 1020, the order score 1030 and the product score 1040 are aggregates of a set of features, where the model has been trained to learn a feature importance. The account score 1020, the order score 1030 and the product score 1040 indicates how "good" a particular order is with respect to its account, order and products, respectively. These scores can be calculated based on historic records on how "similar" orders were accepted/denied.

As shown in FIG. 10, the exemplary account score 1020 is based on a revenue growth, margin growth and goal attainment for the customer account related to the order. In the example of FIG. 10, relative and actual values are presented for the revenue growth (e.g., year over year revenue growth), margin growth (e.g., year over year margin growth) and goal attainment (where goal attainment represents a level of commitment of the customer, such as what was promised relative to what was delivered for the customer). Actual historic values are related to the account, and can be queried from past records with no statistical processing. Relative values represent how this account is doing compared to "similar" values. Relative values are typically percentiles.

As shown in FIG. 10, the exemplary order score 1030 is an aggregation of scores across the entire order. For example, if an order comprises three product items then the order score 1030 gives the quality score of each item and then a weighted score, where the overall revenue may serve as the weight. The machine learning-based metric is obtained by training a decision tree that tries to predict the metric value using the given features, and then scales the residuals to have an order score.

Actual historic values are related to the order, and can be queried from past records with no statistical processing. Relative values represent how this order is doing compared to "similar" values. Relative values are typically percentiles. For example, if an order margin relative value is 39%, this order has a margin that is higher than 39% of similar orders. Similarity is defined by multiple models and criteria including similarity of the region.

As shown in FIG. 10, the exemplary product score 1040 also comprises relative and actual values on an overall level (e.g., for all products in the order) and on a per-product basis, for a margin percentage, floor and a list total revenue per unit (LTRU).

In this manner, the exemplary dashboard 1000 provides one overall or aggregate score 1010 with the ability to look more deeply at additional low-level scores 1020, 1030 and 1040, which gives a reviewer the ability to look at the bigger picture more easily.

With conventional pricing review techniques, the process is manual and orders may be complex. Thus, different reviewers may make different decisions. Further, since large orders are comprised of multiple product items, each item typically has its own margin, floor price, and other attributes as well as each customer having its own attributes and context. Thus, there is a high complexity involved when making a review decision.

Among other benefits, the disclosed order quality score prediction techniques provide automated approvals and denials for orders, and can prioritize additional orders that are not automatically disposed of for further review. In this manner, the volume of orders that need to be reviewed manually is reduced and reviewers can focus their attention on the highest priority orders. Reducing the volume of orders requiring a manual review can also decrease the response time.

Currently, a pricing review (e.g., approving or declining an order) is based solely on the intuition of the member of the pricing review team assigned to the order. Thus, there can be a significant variation between decisions made by different team members. The disclosed order quality score prediction techniques, on the other hand, can reduce the variation (and possible bias) and create a standard that every team member can follow.

In one or more embodiments, the disclosed order quality score prediction pipeline leverages multiple data sources and multiple aspects of an order, can integrate and test new ideas and hypotheses, relies on objective evaluation criteria and provides a final score and reasoning that can be communicated to the user.

One or more embodiments of the disclosure provide improved methods, apparatus and computer program products for order quality score prediction. The foregoing applications and associated embodiments should be considered as illustrative only, and numerous other embodiments can be configured using the techniques disclosed herein, in a wide variety of different applications.

It should also be understood that the disclosed order quality score prediction techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for predicting a quality score for a given order for one or more products may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based order quality score prediction engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based order quality score prediction platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 11 and 12. These platforms may also be used to implement at least portions of other information processing systems in other embodiments.

Figure 11:
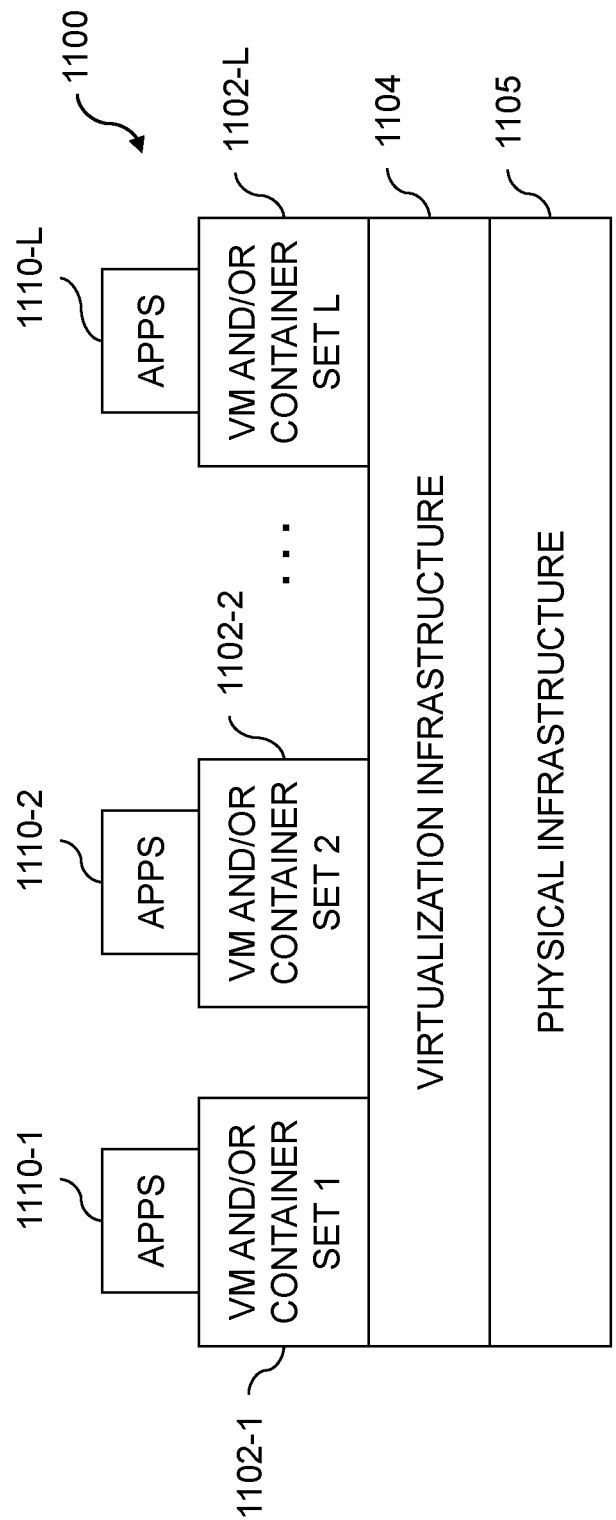
FIG. 11 illustrates an exemplary processing platform that may be used to implement at least a portion of one or more embodiments of the disclosure comprising a cloud infrastructure.

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. Such implementations can provide order quality score prediction functionality of the type described above for one or more processes running on a given one of the VMs. For example, each of the VMs can implement order quality score prediction control logic and associated feature tables for providing order quality score prediction functionality for one or more processes running on that particular VM.

An example of a hypervisor platform that may be used to implement a hypervisor within the virtualization infrastructure 1104 is the VMware® vSphere® which may have an associated virtual infrastructure management system such as the VMware® vCenter™. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system. Such implementations can provide order quality score prediction functionality of the type described above for one or more processes running on different ones of the containers. For example, a container host device supporting multiple containers of one or more container sets can implement one or more instances of order quality score prediction control logic and feature tables for use in generating order quality score predictions.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises at least a portion of the given system and includes a plurality of processing devices, denoted 1202-1, 1202-2, 1202-3, . . . 1202-K, which communicate with one another over a network 1204. The network 1204 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1202-1 in the processing platform 1200 comprises a processor 1210 coupled to a memory 1212. The processor 1210 may comprise a microprocessor, a microcontroller, an application specific integrated circuit (ASIC), a field programmable gate array (FPGA) or other type of processing circuitry, as well as portions or combinations of such circuitry elements, and the memory 1212, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and the given system may include additional or alternative processing platforms, as well as numerous distinct processing platforms in any combination, with each such platform comprising one or more computers, storage devices or other processing devices.

Figure 12:
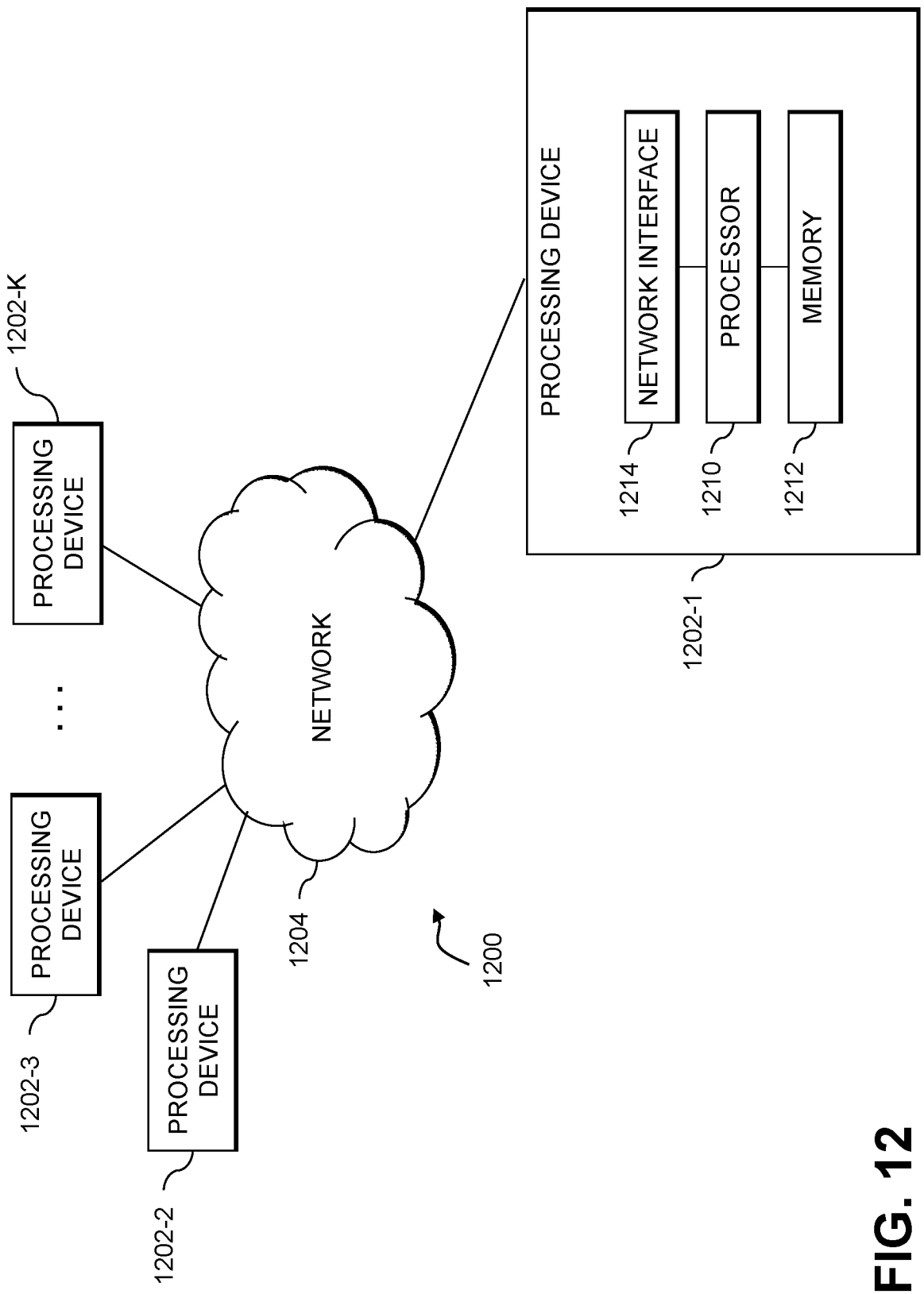
FIG. 12 illustrates another exemplary processing platform that may be used to implement at least a portion of one or more embodiments of the disclosure.

Multiple elements of an information processing system may be collectively implemented on a common processing platform of the type shown in FIG. 11 or 12, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining data for a given product-related data structure;
    evaluating a plurality of first features related to a customer account associated with the given product-related data structure using the obtained data;
    evaluating a plurality of second features using the obtained data from the given product-related data structure;
    training at least one machine learning model during a training phase by evaluating the plurality of first features and the plurality of second features using historical training data comprising at least one acceptance status label such that the at least one machine learning model learns (i) to predict a predicted quality score and (ii) a weighting of one or more first features and one or more second features, wherein the weighting is based at least in part on a feature importance of the one or more first features and a feature importance of the one or more second features, wherein the weighting comprises a first weighting of the one or more first features used to calculate a first score and a second weighting of the one or more second features used to calculate a second score;
    implementing the at least one machine learning model using at least one processing device comprising a processor coupled to a memory;
    applying the one or more first features and the one or more second features to the at least one machine learning model that predicts the predicted quality score for the given product-related data structures;
    predicting, using the at least one machine learning model, the predicted quality score for the given product-related data structure, wherein the predicted quality score for the given product-related data structure comprises an aggregation based at least in part on the first score and the second score;
    applying, using the at least one processing device, one or more thresholds to the predicted quality score to automatically determine an acceptance status related to the given product-related data structure; and
    automatically initiating a processing of the given product-related data structure based at least in part on one or more of the acceptance status and the predicted quality score, wherein the automatically initiating the processing of the given product-related data structure comprises one or more of: (i) initiating a generation of an automated acceptance related to the given product-related data structure based at least in part on the acceptance status; (ii) initiating a generation of an automated denial related to the given product-related data structure based at least in part on the acceptance status; and (iii) initiating a prioritization of the given product-related data structure for a manual review based at least in part on the predicted quality score.

2. The method of claim 1, wherein the acceptance status comprises one or more of an automatically accepted status, an automatically denied status and an additional review required status.

3. The method of claim 2, wherein the acceptance status of the given product-related data structure comprises the automatically accepted status in response to the predicted quality score for the given product-related data structure exceeding a corresponding acceptance threshold, and wherein the acceptance status of the given product-related data structure comprises the automatically denied status in response to the predicted quality score for the given product-related data structure being below a corresponding denial threshold.

4. The method of claim 3, wherein the acceptance status of the given product-related data structure comprises the additional review required status in response to the predicted quality score for the given product-related data structure being between the corresponding acceptance threshold and the corresponding denial threshold.

5. The method of claim 1, further comprising at least one statistical model that determines a second predicted quality score for the given product-related data structure and further comprising selecting one of (i) the predicted quality score for the given product-related data structure predicted by the at least one machine learning model and (ii) the second predicted quality score for the given product-related data structure determined by the at least one statistical model.

6. The method of claim 1, wherein the at least one machine learning model compares the given product-related data structure to similar product-related data structures based on one or more similarity criteria to evaluate a quality of the given product-related data structure.

7. The method of claim 1, wherein the aggregation comprises an aggregation of at least two of an account score, a product-related data structure score and a product score for at least one product associated with the given product-related data structure.

8. The method of claim 1, wherein the given product-related data structure comprises a plurality of items, and wherein a predicted quality score is separately determined for each of the plurality of items and wherein the aggregation further comprises a weighted aggregation of the predicted quality score for each of the plurality of items.

9. An apparatus comprising:
at least one processing device comprising a processor coupled to a memory;
the at least one processing device being configured to implement the following steps:
obtaining data for a given product-related data structure;
evaluating a plurality of first features related to a customer account associated with the given product-related data structure using the obtained data;
evaluating a plurality of second features using the obtained data from the given product-related data structure;
training at least one machine learning model during a training phase by evaluating the plurality of first features and the plurality of second features using historical training data comprising at least one acceptance status label such that the at least one machine learning model learns (i) to predict a predicted quality score and (ii) a weighting of one or more first features and one or more second features, wherein the weighting is based at least in part on a feature importance of the one or more first features and a feature importance of the one or more second features, wherein the weighting comprises a first weighting of the one or more first features used to calculate a first score and a second weighting of the one or more second features used to calculate a second score;
implementing the at least one machine learning model using the at least one processing device;
applying the one or more first features and the one or more second features to the at least one machine learning model that predicts the predicted quality score for the given product-related data structure;
predicting, using the at least one machine learning model, the predicted quality score for the given product-related data structure, wherein the predicted quality score for the given product-related data structure comprises an aggregation based at least in part on the first score and the second score;
applying, using the at least one processing device, one or more thresholds to the predicted quality score to automatically determine an acceptance status related to the given product-related data structure; and
automatically initiating a processing of the given product-related data structure based at least in part on one or more of the acceptance status and the predicted quality score, wherein the automatically initiating the processing of the given product-related data structure comprises one or more of: (i) initiating a generation of an automated acceptance related to the given product-related data structure based at least in part on the acceptance status; (ii) initiating a generation of an automated denial related to the given product-related data structure based at least in part on the acceptance status; and (iii) initiating a prioritization of the given product-related data structure for a manual review based at least in part on the predicted quality score.

10. The apparatus of claim 9, wherein the at least one machine learning model compares the given product-related data structure to similar product-related data structures based on one or more similarity criteria to evaluate a quality of the given product-related data structure.

11. The apparatus of claim 9, wherein the aggregation comprises an aggregation of at least two of an account score, a product-related data structure score and a product score for at least one product associated with the given product-related data structure.

12. The apparatus of claim 9, wherein the acceptance status comprises one or more of an automatically accepted status, an automatically denied status and an additional review required status.

13. The apparatus of claim 12, wherein the acceptance status of the given product-related data structure comprises the automatically accepted status in response to the predicted quality score for the given product-related data structure exceeding a corresponding acceptance threshold, and wherein the acceptance status of the given product-related data structure comprises the automatically denied status in response to the predicted quality score for the given product-related data structure being below a corresponding denial threshold.

14. The apparatus of claim 13, wherein the acceptance status of the given product-related data structure comprises the additional review required status in response to the predicted quality score for the given product-related data structure being between the corresponding acceptance threshold and the corresponding denial threshold.

15. The apparatus of claim 9, wherein the given product-related data structure comprises a plurality of items, and wherein a predicted quality score is separately determined for each of the plurality of items and wherein the aggregation further comprises a weighted aggregation of the predicted quality score for each of the plurality of items.

16. A non-transitory processor-readable storage medium having stored therein program code of one or more software programs, wherein the program code when executed by at least one processing device causes the at least one processing device to perform the following steps:

obtaining data for a given product-related data structure;

evaluating a plurality of first features related to a customer account associated with the given product-related data structure using the obtained data;

evaluating a plurality of second features using of the obtained data from the given product-related data structure;

training at least one machine learning model during a training phase by evaluating the plurality of first features and the plurality of second features using historical training data comprising at least one acceptance status label such that the at least one machine learning model learns (i) to predict a predicted quality score and (ii) a weighting of one or more first features and one or more second features, wherein the weighting is based at least in part on a feature importance of the one or more first features and a feature importance of the one or more second features, wherein the weighting comprises a first weighting of the one or more first features used to calculate a first score and a second weighting of the one or more second features used to calculate a second score;

implementing the at least one machine learning model using the at least one processing device;

applying the one or more first features and the one or more second features to the at least one machine learning model that predicts the predicted quality score for the given product-related data structure;

predicting, using the at least one machine learning model, the predicted quality score for the given product-related data structure, wherein the predicted quality score for the given product-related data structure comprises an aggregation based at least in part on the first score and the second score;

applying, using the at least one processing device, one or more thresholds to the predicted quality score to automatically determine an acceptance status related to the given product-related data structure; and automatically initiating a processing of the given product-related data structure based at least in part on one or more of the acceptance status and the predicted quality score, wherein the automatically initiating the processing of the given product-related data structure comprises one or more of: (i) initiating a generation of an automated acceptance related to the given product-related data structure based at least in part on the acceptance status; (ii) initiating a generation of an automated denial related to the given product-related data structure based at least in part on the acceptance status; and (iii) initiating a prioritization of the given product-related data structure for a manual review based at least in part on the predicted quality score.

17. The non-transitory processor-readable storage medium of claim 16, wherein the acceptance status of the given product-related data structure comprises one or more of an automatically accepted status in response to the predicted quality score for the given product-related data structure exceeding a corresponding acceptance threshold, an automatically denied status in response to the predicted quality score for the given product-related data structure being below a corresponding denial threshold, and an additional review required status in response to the predicted quality score for the given product-related data structure being between the corresponding acceptance threshold and the corresponding denial threshold.

18. The non-transitory processor-readable storage medium of claim 16, wherein the at least one machine learning model compares the given product-related data structure to similar product-related data structures based on one or more similarity criteria to evaluate a quality of the given product-related data structure.

19. The non-transitory processor-readable storage medium of claim 16, wherein the aggregation comprises an aggregation of at least two of an account score, a product-related data structure score and a product score for at least one product associated with the given product-related data structure.

20. The non-transitory processor-readable storage medium of claim 16, wherein the given product-related data structure comprises a plurality of items, and wherein a predicted quality score is separately determined for each of the plurality of items and wherein the aggregation further comprises a weighted aggregation of the predicted quality score for each of the plurality of items.

* * * * *

UNITED STATES PATENT AND TRADEMARK OFFICE
CERTIFICATE OF CORRECTION

| | |
|---|---|
| PATENT NO. | : 11,615,366 B2 |
| APPLICATION NO. | : 16/849199 |
| DATED | : March 28, 2023 |
| INVENTOR(S) | : Amihai Savir et al. |

It is certified that error appears in the above-identified patent and that said Letters Patent is hereby corrected as shown below:

In the Claims

Column 14, Line 39, in Claim 1, replace "given product-related data structures" with – given product-related data structure –

Signed and Sealed this
Twenty-fifth Day of April, 2023

Katherine Kelly Vidal
*Director of the United States Patent and Trademark Office*